(12) United States Patent
Polson

(10) Patent No.: US 10,360,600 B1
(45) Date of Patent: Jul. 23, 2019

(54) BIG TREE METHOD AND SYSTEM FOR VERIFYING USER REVIEWS

(71) Applicant: Peter Polson, Seattle, WA (US)

(72) Inventor: Peter Polson, Seattle, WA (US)

( * ) Notice: Subject to any disclaimer, the term of this patent is extended or adjusted under 35 U.S.C. 154(b) by 192 days.

(21) Appl. No.: 15/174,836

(22) Filed: Jun. 6, 2016

Related U.S. Application Data

(63) Continuation-in-part of application No. 14/740,235, filed on Jun. 15, 2015, now abandoned.

(60) Provisional application No. 62/012,377, filed on Jun. 15, 2014.

(51) Int. Cl.
  *G06Q 30/02* (2012.01)
  *G06Q 30/00* (2012.01)
  *H04L 29/08* (2006.01)
  *G06Q 30/06* (2012.01)
  *G06Q 40/02* (2012.01)

(52) U.S. Cl.
  CPC ....... *G06Q 30/0282* (2013.01); *G06Q 30/018* (2013.01); *G06Q 30/0631* (2013.01); *H04L 67/306* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 2009/0210444 A1* | 8/2009 | Bailey | G06Q 30/02 |
| 2011/0231257 A1 | 9/2011 | Winters | |
| 2012/0102048 A1* | 4/2012 | Heer | G06Q 30/02 707/749 |
| 2014/0258169 A1* | 9/2014 | Wong | G06Q 30/0282 705/347 |
| 2014/0351079 A1* | 11/2014 | Dong | G06Q 30/0631 705/26.7 |
| 2015/0248721 A1* | 9/2015 | Brown | G06Q 30/0631 705/26.7 |

* cited by examiner

*Primary Examiner* — Scott A Zare
(74) *Attorney, Agent, or Firm* — Rowan TELS LLC

(57) ABSTRACT

A system and method for generating recommendations based on verified user reviews receives verified user reviews from a rating system. The system and method constructs and updates user profiles based on various factors including location and demographic information. This information is used to create comparison points between profiles which is used to amplify certain possible recommendations based on the similarity between the users. This information may then be used to trigger the population of a user interface.

18 Claims, 10 Drawing Sheets

BIG TREE METHOD AND SYSTEM FOR VERIFYING USER REVIEWS

CROSS-REFERENCE TO RELATED APPLICATIONS

This is a continuation-in-part of U.S. application Ser. No. 14/740,235 filed on Jun. 15, 2015 and claims priority and benefit under 35 U.S.C. 119 to U.S. application Ser. No. 62/012,377, filed on Jun. 15, 2014, which is incorporated herein by reference in its entirety.

BACKGROUND

Publicly available reviews are an information sourced used by buyers and sellers to evaluate commercial transactions and/or information quality over the Internet. With the amount of information available, individuals frequently rely on ratings from friends, experts, or the general public to evaluate products and services. However, there is a growing problem with fraudulent reviews, decreasing the accuracy of the reviews and their usefulness for both customers and business owners.

According to some studies, as many as 30% of all online reviews are fake (G. Jeffrey MacDonald, Paid product reviews are spreading on the Internet. Can technology help?, The Christian Science Monitor, Oct. 18, 2012). Review systems fall apart if the reviews become untrustworthy. Attempts have been made to eliminate fraudulent reviews, but currently the only way to determine if a user has actually tried a product or service is if the product or service was purchased through the site hosting the review.

Online reviews can be helpful for both consumers and businesses, providing feedback on products and services. However, there is a problem with false reviews, either praising or denigrating a product or service. There is therefore a need for a means of verifying that a reviewer actually purchased the product or service being reviewed, regardless of where item was purchased.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
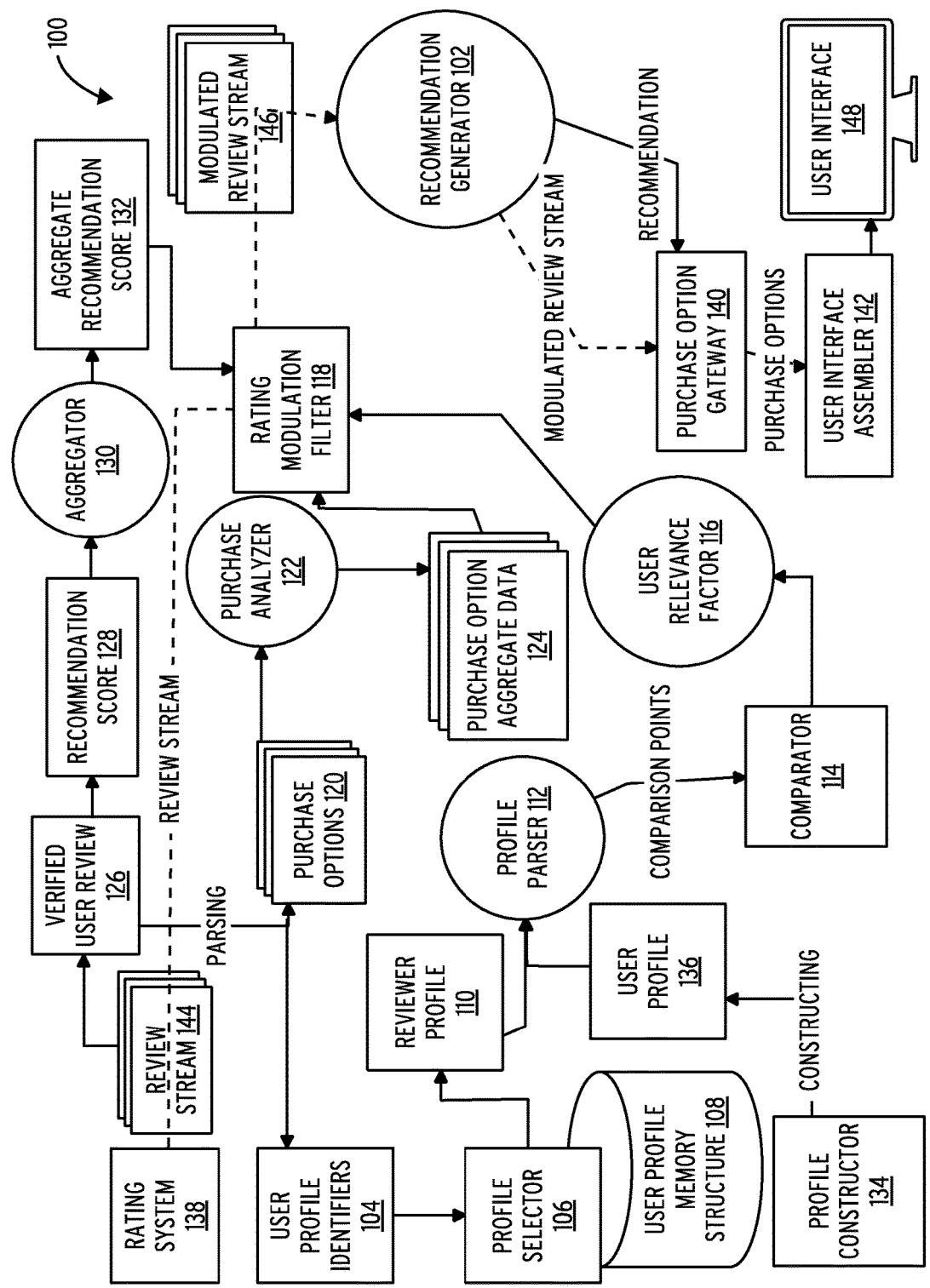
FIG. 1 illustrates an embodiment of a system for generating recommendations based on verified user reviews 100.

"Gateway" in this context refers to A hardware or software component that functions as a node permitting access to other nodes on the Network and/or performing the functions of other Network nodes. For example, the gateway can function as a policy enforcement point controlling the egress of data packet traffic in accordance with the established policy controls set forth by another component on the network.

"Ingestion engine" in this context refers to A logic component for obtaining, importing, and processing data for use in a database or system. The ingestion engine handles distribution of processed data for further processing or use. The ingestion engine can include or communicate with components for receiving data such as email systems, Application program interfaces, and user interfaces.

"Profile constructor" in this context refers to logic to aggregate, format and populate user data within a profile, including directly querying a user for additional information needed to keep the profile updated.

"Purchase" in this context refers to An individual item acquired. Purchases are frequently displayed as a line item in a receipt.

"Purchase option" in this context refers to goods or services

"Purchase option aggregate data" in this context refers to data from a meta analysis of reviews and purchase data. This data may be based on spending, trend factors, reviews, and seeing larger than average tips (inferred based on pending credit charges vs settled credit charges "Review stream" in this context refers to a stream or signal of verified user reviews.

"Transaction" in this context refers to Record of the sum total of purchases made at a particular venue at a particular time. A transaction may comprise a group of purchases.

"User generated review" in this context refers to a review generated by the user, not extrapolated from purchase data. For example, a written review or "like."

"User input" in this context refers to information provided to the system by the user. Such information may be directly input by the user, receipts scanned in by the user and processed using OCR, information sent via text or SMS to the server, or otherwise input by the user.

"User relevance factor" in this context refers to a numerical value depicting the relevance of a given review to a given user. This value may be calculated based on comparison points between users, which may include demographics information, spending patterns, geolocation data, recommendation histories, and social network "friends."

Description

Provided herein is a means for verifying purchases from any source before allowing a user to rate a product or service. Further provided is a means for allowing a user to change their rating, but to only vote once per product. Ratings may be captured by any means generally used, including quantitative and/or qualitative rating systems. In some embodiments, users may be limited to giving a simple vote of approval or disapproval.

In some embodiments, a user inputs a rating for a particular product or service. The ratings service queries a server to determine if the user has actually purchased the product or service. The server queries a database which stores user purchase record to determine if a particular item was purchased.

Purchase record may be captured by any means generally used. In some embodiments, a user may manually enter all or part of purchase information. In another embodiment, a user may scan in or take a picture of a receipt or other purchase document and transactions and amounts are recognized by optical character recognition (OCR). In additional embodiments, users may mail in receipts. Users may also forward emails containing purchase information to a central email address. In further embodiments, users may allow access to their email accounts to a third party and the third party may search or otherwise identify email receipts. In yet another embodiment, users may allow access to purchasing accounts to a third party which may then extract purchases. The system described herein may then parse individual receipts for each transaction, determining individual items purchased and each item's costs.

Each item purchased can be grouped with the other items purchased in the same event and matched with bank and credit card transactions to ensure that all purchases are being captured. In some embodiments, if a receipt is not sufficiently detailed, algorithms may be used to infer purchases for retailers with smaller inventory by comparing purchase totals with likely combinations of purchases. For example a purchase at a coffee store for $6.15 may be parsed into one hot chocolate and one coffee which would allow multiple ratings, one for the store, one for the coffee and one for the hot chocolate. In other embodiments, if there is no receipt information for a bank or credit card transaction, a user may be asked to provide additional detail regarding the transaction.

If an item is identified from the user data, it may be verified with a bank or credit card, matching the individual purchase with the total purchase made in that transaction and verifying that the sale occurred. Once a transaction is verified, a rating is permitted to proceed and the result displayed. In some embodiments, transactions may be verified to a certain confidence threshold. For example, in some embodiments there may not be enough information to verify what purchase was made, however if a person is trying to rate a $120.00 item and only a $75.00 purchase was made, there is a high probability that the consumer did not purchase that item and therefore should not be allowed to rate it. In one embodiment, a user may only enter a single rating per item or service. For example, if a user returns to a restaurant, they may only rate the restaurant once, but they may change their mind and change their rating. Similarly, if a user purchases ten pairs of the same socks, they may only enter one rating, not ten. In other embodiments, the user may be allowed to rate the merchant as well as each of the items purchased.

The system may collect user data and asks the user for reviews, and shares recommendations based on activity from other users, including their reviews and spending, combined with user data in order to personalize the recommendations.

By way of example, when a user accesses the system, the user may register by adding one or more of credit cards or other bank accounts. The user may also link merchant or business accounts with line item details.

The system may infer that a user loves opera, drives a Toyota, shops at Whole Foods, and visits coffee shops regularly with a preference for independent coffee shops over Starbucks. This may be combined with user-entered demographic data such as zip code, marital status, number and ages of children, allowing the system to increasingly tailor recommendations such as new places to eat, good plumbers, or a movies to watch on a Friday night.

As the user makes purchases, the collection side of the app may prompt the user to provide a rating, giving a rating for each line item. The system may prompt non-active users to give a single review of a particular item, such as a recently purchased item, when the system is accessed, as a way to gather more data.

The ratings system considers reviews and purchase data from others, combined with user information, to provide recommendations.

For example, if the user is looking for a lunch recommendation, several factors could be incorporated into a recommendation. A restaurant may receive a higher recommendation if it: 1) receives a lot of purchases from others; 2) receives a lot of purchases from others with spending similar to the user's; 3) receives a lot of purchases from others with similar demographics to the user; 4) is seeing an increase in frequency, total spending, and/or spending per visit; 5) is seeing larger than average tips; (the system may infer when a credit card is used by comparing the original pending charge with no tip versus the final settled charge with tip); 6) is highly rated by other users; 7) is highly rated by others like the user, with similar spending patterns, recommendation histories, and/or demographics to the user; 8) is frequented by others in the user's social network.

All of these signals, and more, may be used to provide valuable recommendations based on the activity of large groups of people. This is in contrast to some recommendation services today, that rely on a vocal minority of reviewers with a small sample of data, some of which may be fraudulent (friends of the business providing positive reviews, competitors of the business providing negative reviews, or customers of the business who are coerced to provide reviews).

Reviews may be amplified by geography, which may be determined by geocoded spending data, by user inputs (zip codes), and by GPS or location data from a phone or a device. A positive review by a user in their neighborhood, combined with many repeat purchases, is a strong signal. A positive review by the user, combined with no repeat visits, is a weak signal or possibly contraindicating signal. For example, when a user travels to New York for a weekend, a single purchase with a thumbs up from the user and a large tip at the museum cafe might might be a stronger review for others visiting from out of town who might have just purchased a pass at that same museum. In contrast, the user's review there might be a weak signal for a local New Yorker who usually frequents national chains and might be looking for a quick bite to eat on their way from the gym to the office.

The rating system also amplifies the signal if there are other buyers with similar backgrounds who are also repeat purchasers. For example, a user's neighbors may also regularly visit the neighborhood coffee shop that the user loves. While the user's neighbors haven't provided a review, their purchase patterns are similar to the user's, their demographic background is similar to the user's, and therefore they amplify the user's review even if they don't provide a review themselves. The rating system also uses the user's demographics to determine the relevance of a review. If the user is a high school educated, single woman spending $5 k a month, the user will have a strong association with the spending patterns of others like them, but a weak association with someone who lives in a different neighborhood, spends $20 k a month, is 45 years old, and has four children.

DRAWINGS

Figure 2:
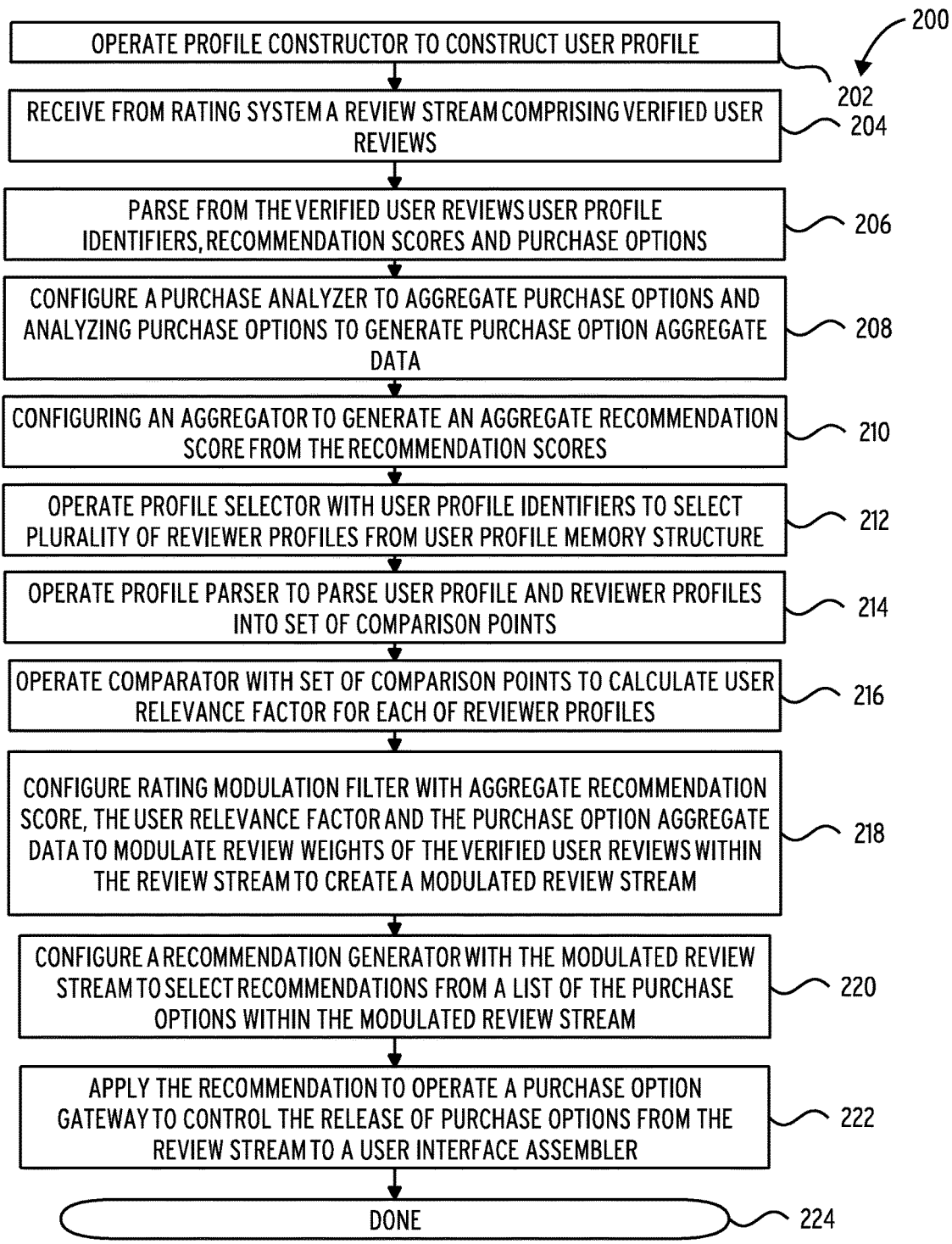
FIG. 2 illustrates an embodiment of a method for generating recommendations based on verified user reviews 200.

The system for generating recommendations based on verified user reviews 100 comprises a verified user review 126, recommendation score 128, aggregator 130, aggregate recommendation score 132, Rating system 138, user profile identifiers 104, purchase options 120, purchase analyzer 122, rating modulation filter 118, profile selector 106, reviewer profile 110, profile parser 112, purchase option aggregate data 124, user profile memory structure 108, user profile 136, profile constructor 134, comparator 114, user relevance factor 116, recommendation generator 102, purchase option gateway 140, user interface assembler 142, review stream 144, modulated review stream 146, and user interface 148. The system for generating recommendations based on verified user reviews 100 may be operated in accordance with the precesses described in FIG. 2.

In block 202, method for generating recommendations based on verified user reviews 200 operates a profile constructor to construct a user profile. In block 204, method for generating recommendations based on verified user reviews 200 receives from a rating system. In block 206, routine 200 parses from the verified user reviews and user profile identifiers, recommendation scores and purchase options. In block 208, method for generating recommendations based on verified user reviews 200 configures a purchase analyzer to aggregate the purchase options and analyzing the purchase options to generate purchase option aggregate data. In block 210, method for generating recommendations based on verified user reviews 200 configures an aggregator to generate an aggregate recommendation score from the recommendation scores. In block 212, method for generating recommendations based on verified user reviews 200 operates a profile selector with the user profile identifiers to select a plurality of reviewer profiles from a user profile memory structure. In block 214, method for generating recommendations based on verified user reviews 200 operates a profile parser to parse the user profile and reviewer profiles into a set of comparison points. In block 216, method for generating recommendations based on verified user reviews 200 operates a comparator with the set of comparison points to calculate a user relevance factor for each of the reviewer profiles. In block 218, method for generating recommendations based on verified user reviews 200 configures rating modulation filter with the aggregate recommendation score. In block 220, method for generating recommendations based on verified user reviews 200 configures a recommendation generator with the modulated review stream to select recommendations from a list of the purchase options within the modulated review stream. In block 222, method for generating recommendations based on verified user reviews 200 applies the recommendation to operate a purchase option gateway to control the release of purchase options from the review stream to a user interface assembler. In done block 224, method for generating recommendations based on verified user reviews 200 ends.

The method for generating recommendations based on verified user reviews 200 improves the efficiency of the computer by allowing it to efficiently make recommendations based on a user's similarity to other users. It may accomplish this by utilizing comparison points between profiles to create a weight based on that reviewer, this weight can be used to amplify or attenuate purchase options within the stream. The signal from this process to operate a gateway, allowing only the most amplified signals to transit the gateway to trigger the assembly of an interface. Further, by allowing weights for likely purchase options to be pre-calculated to allow for reduced server load during peak times in remote applications.

In some embodiments, a method of generating recommendations may include operating a profile constructor to construct a user profile, and receiving a review stream from a rating system. Then parsing user profile identifiers, recommendation scores and purchase options from the verified user reviews in the review stream. Configuring a purchase analyzer to aggregate the purchase options and analyzing the purchase options to generate purchase option aggregate data. Further, configuring an aggregator to generate an aggregate recommendation score from the recommendation scores; operating a profile selector with the user profile identifiers to select a group of reviewer profiles from a user profile memory structure. Then operating a profile parser to parse the user profile and reviewer profiles into a set of comparison points. Operating a comparator with the set of comparison points to calculate a user relevance factor for each of the reviewer profiles. Then the rating modulation filter may be configured with the aggregate recommendation score, the user relevance factor and the purchase option aggregate data to modulate review weights of the verified user reviews within the review stream to create a modulated review stream. A recommendation generator is then configured with the modulated review stream to select recommendations from a list of the purchase options within the modulated review stream and/or applying the recommendation to operate a purchase option gateway to control the release of the purchase options from the review stream to a user interface assembler. Then the recommendation may be applied to operate a purchase option gateway to control the release of the purchase options from the review stream to a user interface assembler.

Calculating the user relevance factor may include comparison of demographic data, verified purchase data, social media network, purchase types, geolocation and travel history. Constructing the user profile may further include combining the verified user reviews, demographic and direct answer data into the user profile. The profile constructor constructing the user profile may further include collecting purchase information, verified user reviews, verified purchase data and personal data, and updating information in the user profile. The rating modulation filter modulating the review stream amplifies the review weight of the verified user reviews based on the value of the user relevance factor. The purchase option aggregate data may further include data based on a meta analysis of the verified user reviews for the purchase option. The user profile may further include verified purchase data, verified user reviews, demographic information, travel habits, and direct answer data. The modulated review stream may further comprise a weighted aggregate recommendation score. The recommendation score may further include a numerical score denoting whether the verified user review is positive or negative.

Figure 3:
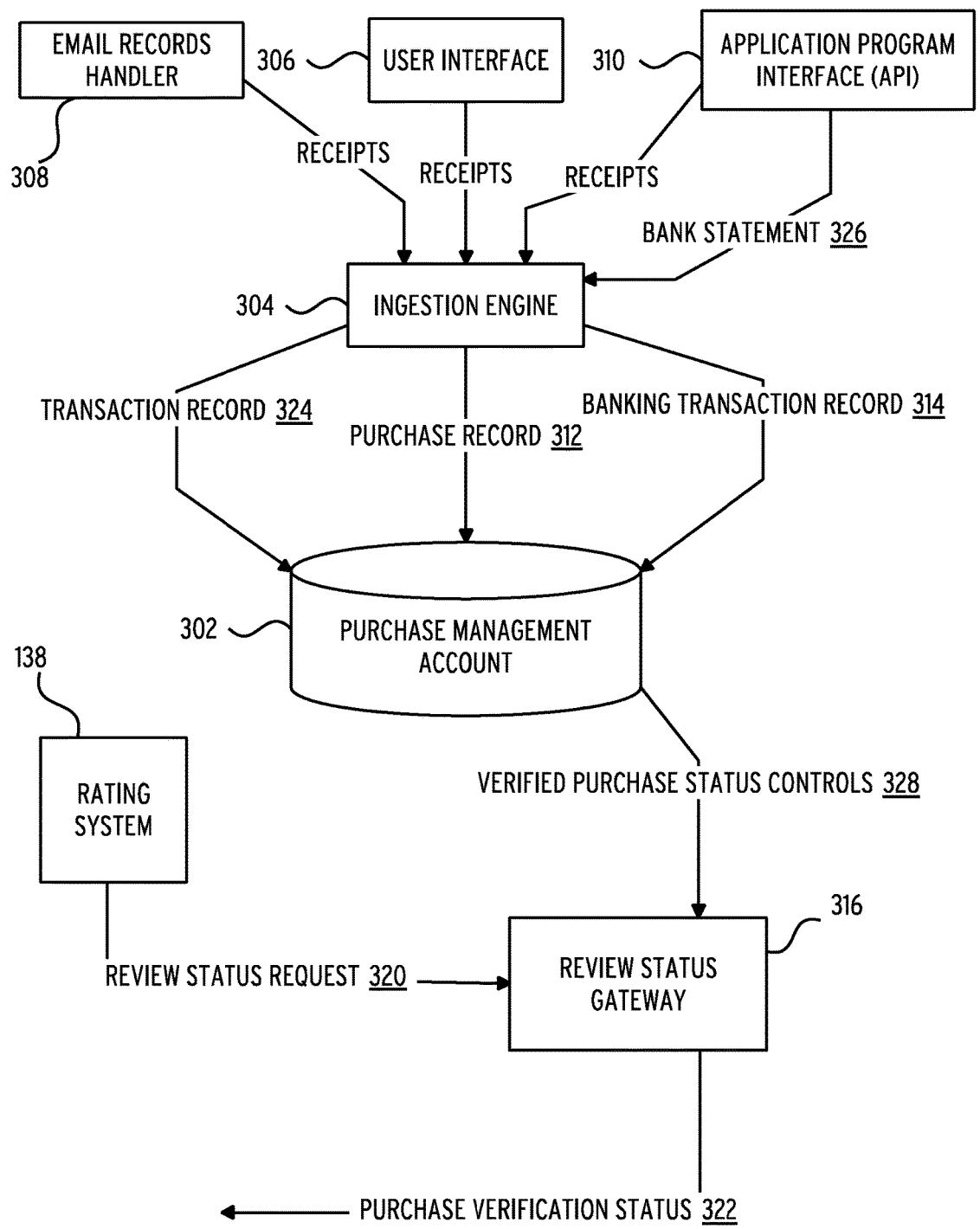
FIG. 3 is a system diagram of an embodiment of the method of verifying user reviews.

Referencing FIG. 3, the method for verifying user reviews comprises an Ingestion engine 304, a Purchase management account 302, a Rating system 138, and a Review status gateway 316. The Ingestion engine 304 receives receipts and Bank statement 326 and in turn transforms the receipts into line item Purchase record 312 and complementarily associated Transaction record 324, while transforming the Bank statement 326 into line item Banking transaction record 314. The Ingestion engine 304 sends the line item Purchase record 312, the complementarily associated Transaction record 324, and the Banking transaction record 314 to a Purchase management account 302. The Purchase management account 302 functions as a repository for user transactions and purchases. Validation of the Purchase record 312 occurs in the Purchase management account 302. Validation corroborates information of the Purchase record 312 with that of the Banking transaction record 314. The corroboration is accomplished through identification and matching of a Banking transaction record's 114 transaction identifiers and transaction totals with the transaction identifiers and transaction totals of the complementarily associated Transaction record 324. Corroboration of the Purchase record 312 with the banking transaction validates the Purchase record 312 which in turn is used in a transformation to generate a Verified purchase status controls 328 for the Review status gateway 316. The Verified purchase status controls 328 is a policy definition for the validated purchase record that permits transmission of a Purchase verification status 322 for a Review status request 320 containing the same or matching item identifier as the validated purchase record. The Rating system 138 is an external component that collects and manages user ratings. The rating system communicates with a rating user's Review status gateway 316 linked to their Purchase management account 302. When a user generates a review for a merchant, item, or service, the Rating system 138 seeks verification that reviewing user has interacted with said merchant, purchased said item, or retained said service through a Purchase verification status 322 generated from the Review status gateway 316. The Review status request 320 comprises a particular item identifier which when transmitted to the Review status gateway 316 is used in a comparison with the Verified purchase status controls 328. If the Review status gateway 316 identifies a match between the particular item identifier and the item identifier of the Verified purchase status controls 328, the Review status gateway 316 permits the release of the Purchase verification status 322. Following the release, the Purchase verification status 322 is then displayed with the user's review.

In some embodiments, the Ingestion engine 304 receives receipts from an Email records handler 308. Email records handler 308 functions as an intermediary between the Ingestion engine 108 and the various sources of Email transaction record. Email transaction record are emails containing receipt information. In some embodiment the Email transaction record provided to the emails Email records handler 308 by emails harvesters. Email harvesters would go through a user's email account and extract emailed invoices and receipts which it then forwards to the Email records handler 308. In some embodiment the email harvester could pull shipping invoice information to supplement details of an emailed invoice or receipt. Additionally, the Email records handler 308 may receive an Email transaction record forwarded by a user or by a forwarding email address given to a merchant.

In some embodiments, the Ingestion engine 304 receives receipts from a user interface 306. The user interface 306 functions as the source of user submitted inputs containing purchase receipt information. User input can be textual inputs or images containing purchase receipt information. In some embodiments the user interface 306 would display various input fields where a user could fill with the transaction details and purchase information of a purchase receipt. Additionally, in some embodiments, the user interface 306 permits uploading of a receipt image. In the aforementioned embodiment, the Ingestion engine 304 would include Optical character recognition (OCR) functionality to identify and capture the transaction details and purchase information within the receipt image.

The Application program interface (API) 310 is provided as a source of both receipts and Bank statement 326. In some embodiment a user would enable access to a shopping account on merchant's site. In the aforementioned embodiment, a merchant site's API would permit access to the user's order history and Purchase receipt which in turn would be extracted and sent to the ingestion engine for parsing into line item purchase record and transaction record. In some embodiments the user would enable access to their bank or credit card accounts. In the aforementioned embodiment, a banking or financial institution's API would permit access to a user's recent transactions and bank statement which in turn would be pulled and transmitted to the ingestion engine for parsing into line item Banking transaction.

Figure 4:
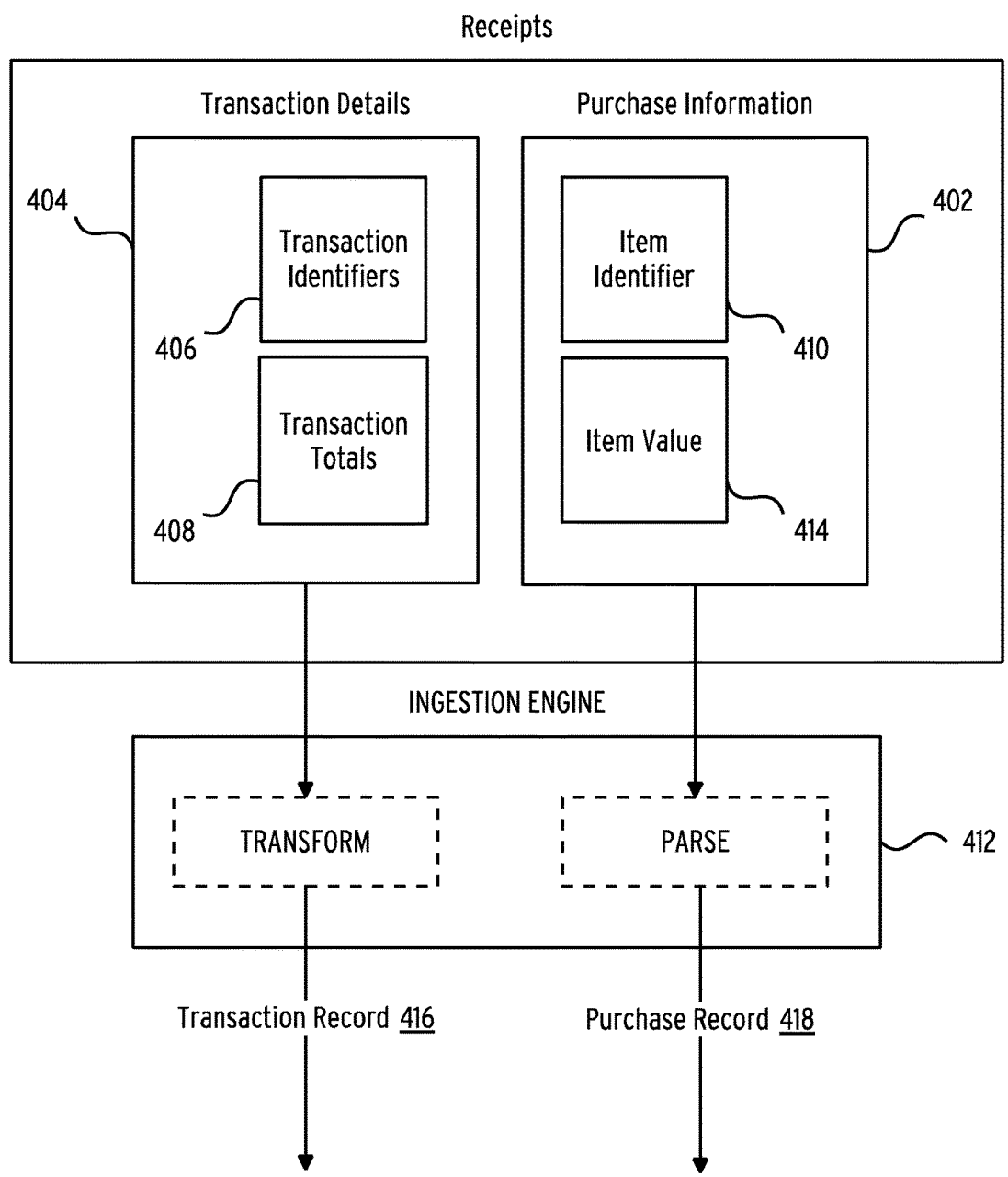
FIG. 4 is a system diagram displaying the processing of receipt data by an ingestion engine.

Referencing FIG. 4, the Ingestion engine 412 transforms a receipt into a Transaction record 416 and line item Purchase record 418. A receipt comprises Transaction details 404 and Purchase information 402. Transaction details 404 comprise Transaction identifiers 406 and transaction totals 408. Transaction identifiers 406 are any values that could be used to distinguish a particular purchase receipt such as merchant details (name, location, merchant number, etc.), transaction date/time, and payment details (payment method, particular bank/credit card use, etc.). transaction totals 408 are the total value cost paid by a user that includes tax, shipping, and any additional no itemized fees or costs experienced for the particular transaction. Purchase information 402 comprises details of each purchased item in the purchase receipt in the form of Item identifier 410 and Item value 414. The Item identifier 410 are the particulars used to identify a purchase such as item name, description, item number, and etc. The Item value 414 is the price paid by the user for said item. Upon receiving the receipt the Ingestion engine 412 transforms the Transaction details 404 into a Transaction record 416 and parses Purchase information 402 into Purchase record 418. The Ingestion engine 412 provides a complementary association between the Transaction record 416 and Purchase record 418 created from the same purchase receipt. the complementary relationship allows associated Transaction record 416 and to share information within a purchase management account. The Transaction details 404 of a Transaction record 416 complementarily associated with a Purchase record 418 would be used for corroborating said Purchase record 418 with a banking transaction record.

Figure 5:
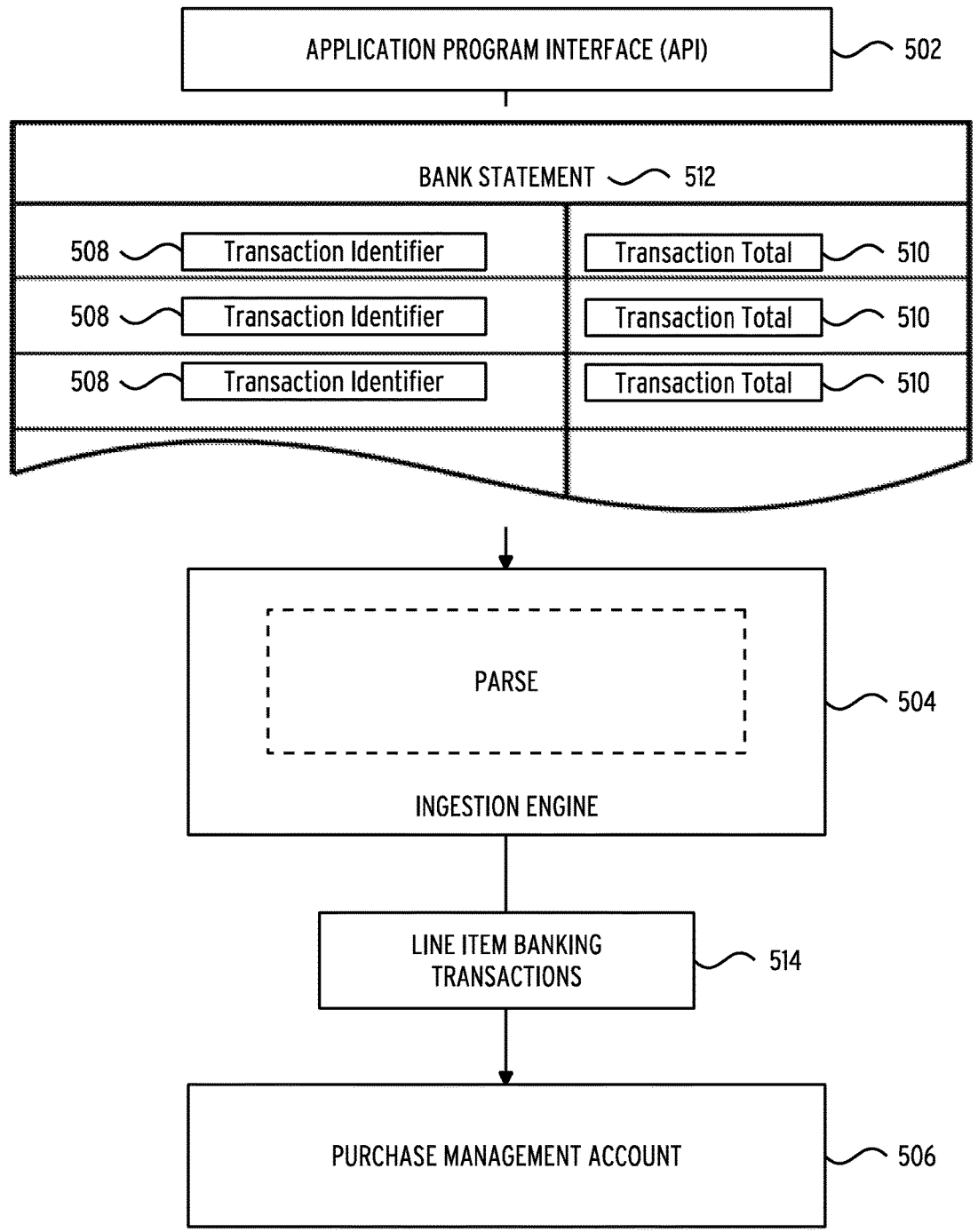
FIG. 5 is a system diagram of embodiment displaying the process of transforming a bank statement into line item banking transactions.

Referencing FIG. 5, the transformation of a bank statement 512 into Line item banking transactions 514 provides corroborating information for the line item purchase records. In some embodiments, a bank statement 512 is received from a user's bank or other financial institution through an Application program interface (API) 502. The bank statement 512 comprises Transaction identifier 508 and corresponding transaction total 510 representing individual banking transactions. The Transaction identifier 508 are any identifiable values unique to a particular transaction such as, but not limited to, the merchant details (name, location, merchant number, etc.) and transaction dates. The transaction total 510 is the corresponding total billed by a merchant or entity for a transaction. The Ingestion engine 504 parses through the bank statement 512 to generate Line item banking transactions 514. The Ingestion engine 504 goes through the entire bank statement 512 and combines each Transaction identifier 508 with its corresponding transaction total 510 into Line item banking transactions 514. The Line item banking transactions 514 are then sent to the Purchase management account 506.

Figure 6:
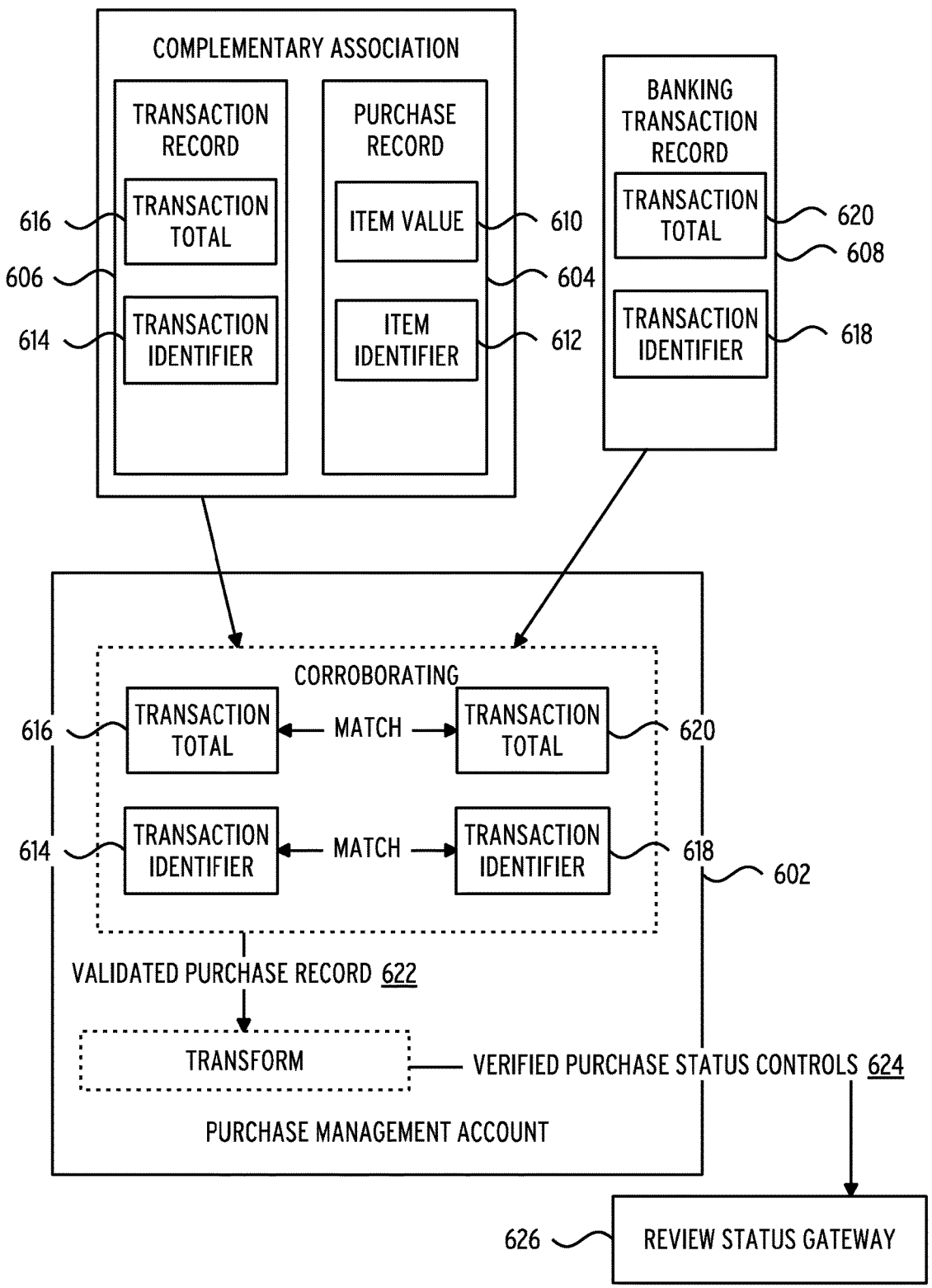
FIG. 6 is a system diagram of an embodiment displaying the corroboration of a purchase record.

Referencing FIG. 6, the purchase management account functions as a repository for user transactions and purchases. The Purchase management account 602 receives line item Purchase record 604 and complementarily associated Transaction record 606. Each line item Purchase record 604 comprises an item value 610 and Item identifier 612, while the complementarily associated Transaction record 606 comprises Transaction total 616 and transaction identifier 614. The Purchase management account 602 receives line item Banking transaction record 608 each comprising a Transaction total 620 and transaction identifier 618. Validation of the Purchase record 604 occurs in the Purchase management account 602. Validation of the Purchase record 604 corroborates information shared by the Transaction record 606 with that of the Banking transaction record 608. The corroboration is accomplished through identification and matching of a Banking transaction record 608 Transaction total 620 and transaction identifier 618 with the transaction identifier 614 and Transaction total 616 of the complementarily associated Transaction record 606. Corroboration of the Purchase record 604 with the Banking transaction record 314 validates the Purchase record 604 which in turn is used in a transformation to generate a Verified purchase status controls 624 for the Review status gateway 626. The Verified purchase status controls 624 is a policy definition for controlling the traffic through the Review status gateway 626. More specifically a verified purchase status control 424 is a specific policy definition that explicitly enables the release of a purchase verification status through the Review status gateway 626 when a request is made for the Validated purchase record 622.

Figure 7:
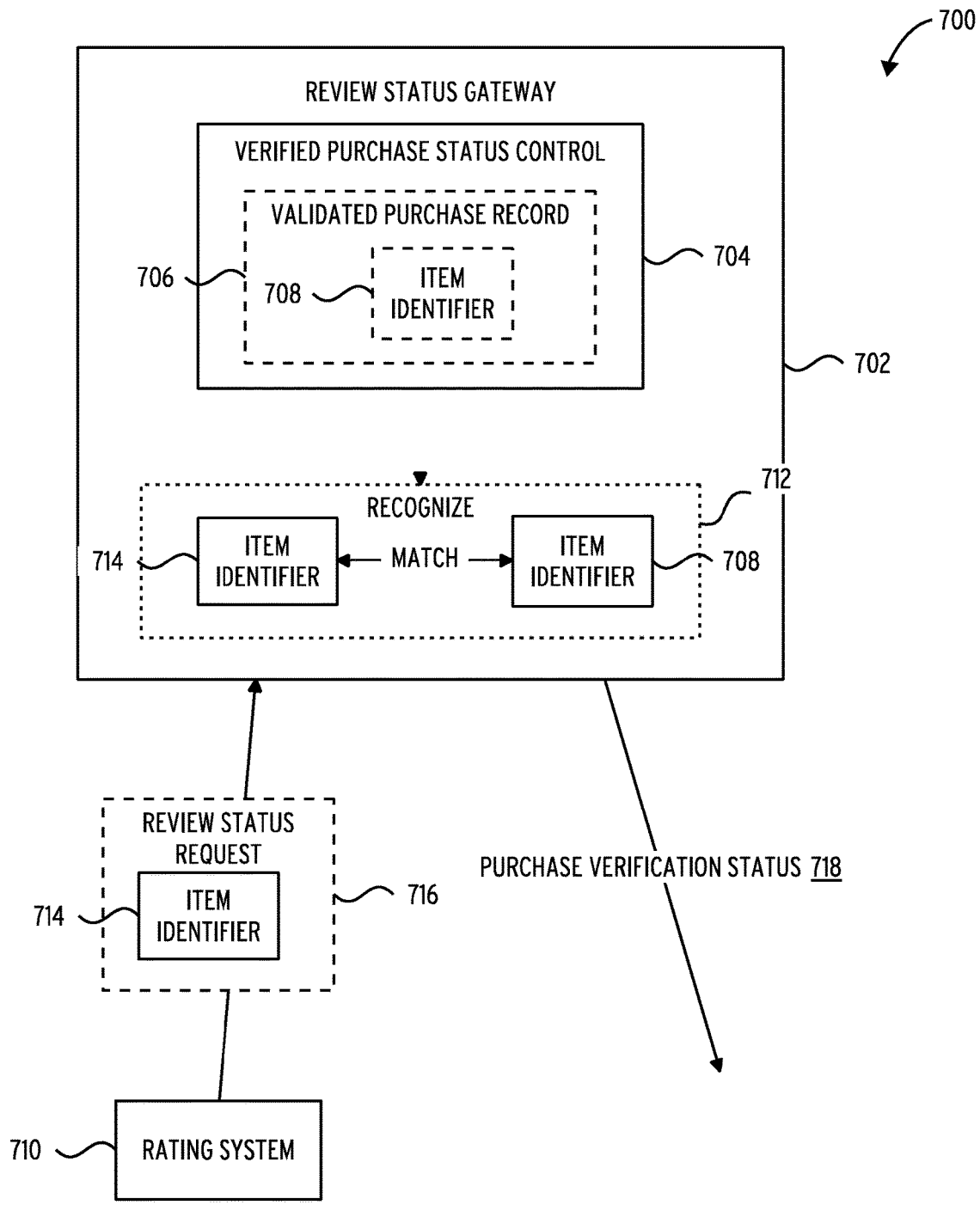
FIG. 7 is a system diagram of an embodiment displaying the management of the review status gateway.
Figure 8:
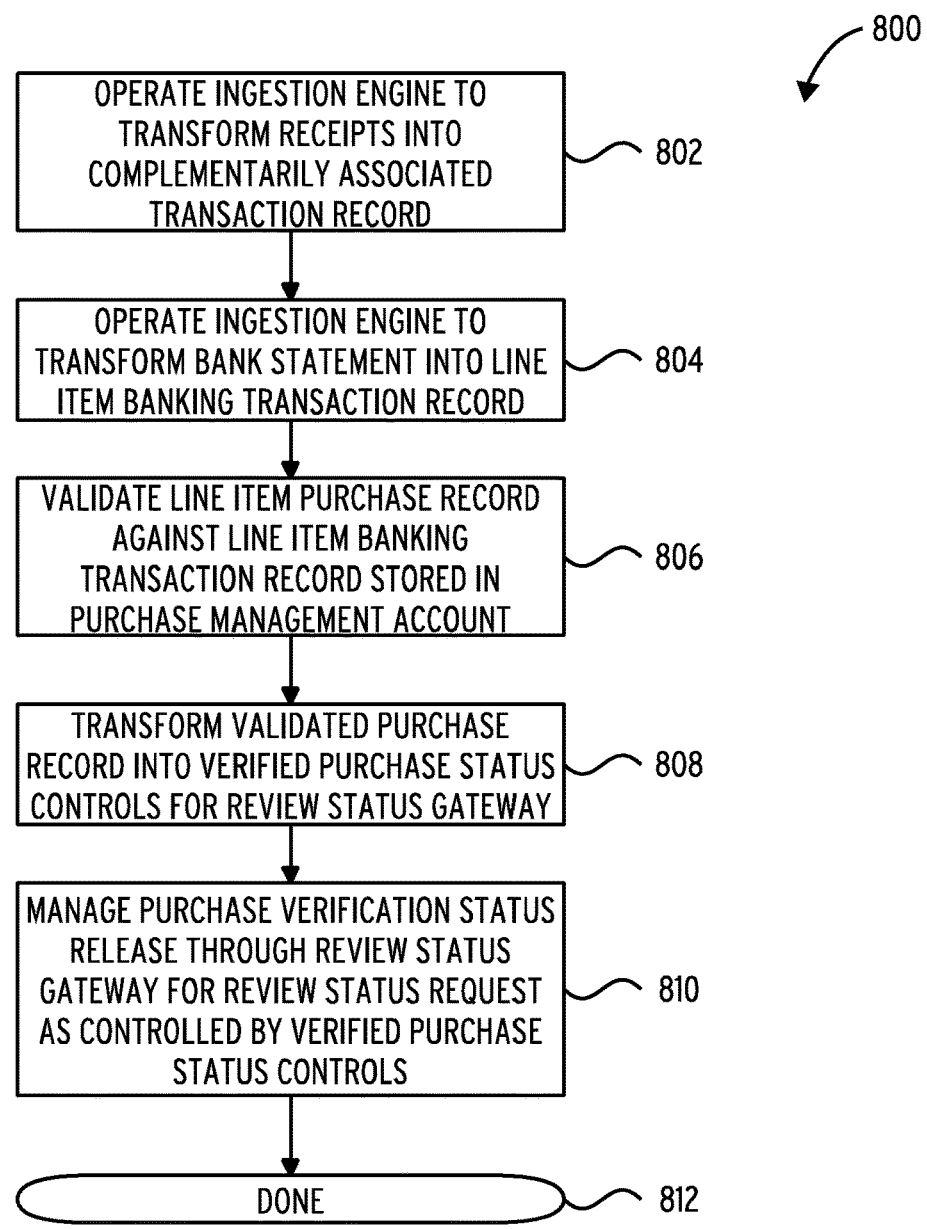
FIG. 8 illustrates a routine for verifying user reviews in accordance with one embodiment.

Referencing FIG. 7, the review status gateway 702 as functions as a network node permitting access to other nodes on a Network and/or performing the functions of said other Network nodes. The review status gateway 702 is a network controller that receives data from the purchase management account and the rating system 710. The review status gateway 702 receives data signal in the form of Review status request 716 from the rating system 710. The review status gateway 702 receives a data signal from the purchase management account in the form of Verified purchase status control 704. The Verified purchase status control 704 is a policy definition for a particular purchase record that permits transmission of a Purchase verification status 718 when a Review status request 716 containing matching or equivalent Particular item identifier 714 as the Validated purchase record 706 is received by the review status gateway 702. The rating system 710 is an external component that collects and manages user ratings. The rating system 710 communicates with a rating user's review status gateway 702 linked to their purchase management account. When a user generates a review for a merchant, item, or service, the rating system 710 seeks verification that reviewing user has interacted with said merchant, purchased said item, or retained said service through a Purchase verification status 718 generated from the review status gateway 702. The Purchase verification status 718 is a confirmation signal to a purchase request that is unique to each Review status request 716 received by the review status gateway 702. The Review status request 716 comprises a Particular item identifier 714 which when transmitted to the review status gateway 702 is compared to the policy definition stored in the Verified purchase status control 704. If the review status gateway 702 identifies a match between the Particular item identifier 714 and the Item identifier 708 of the Verified purchase status control 704, the review status gateway 702 release of the Purchase verification status 718. Following the release, the Purchase verification status 718 is then displayed with the user's review. It should be noted that in some embodiments the 518 would be transmitted back to the rating system 710 to allow it to be displayed by the rating system 710.

In block 802, routine 800 operates an ingestion engine to transform receipts into a complementarily associated transaction record.

In block 804, routine 800 operates the ingestion engine to transform a bank statement into a line item banking transaction record.

In block 806, routine 800 validates the line item purchase record against the line item banking transaction record stored in a purchase management account.

In block 808, routine 800 transforms a validated purchase record into verified purchase status controls for a review status gateway.

In block 810, routine 800 manages purchase verification status release through the review status gateway for a review status request as controlled by the verified purchase status controls.

In done block 812, routine 800 ends.

Figure 9:
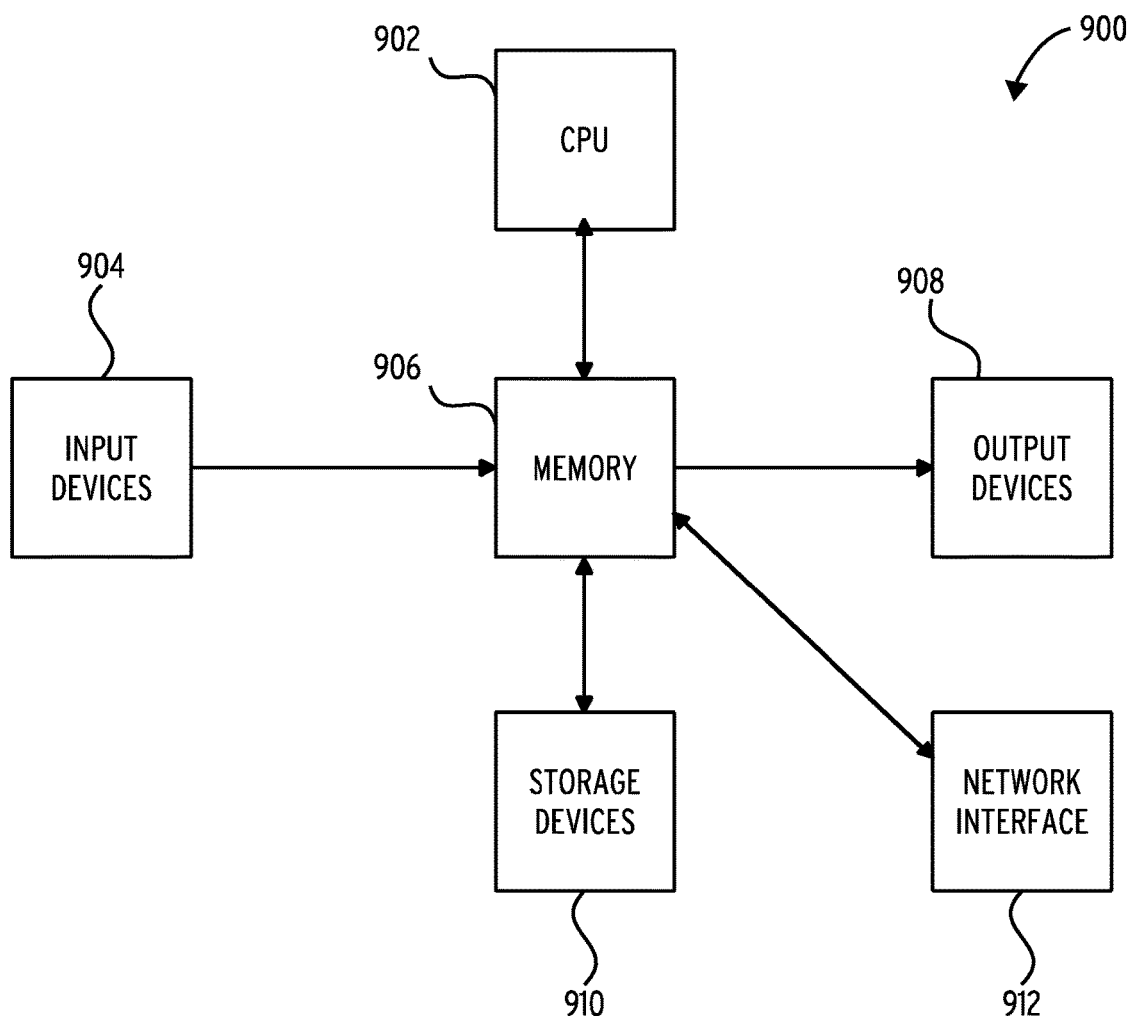
FIG. 9 illustrates a digital apparatus 700 that may implement elements of the system and processes described herein.

FIG. 9 illustrates a digital apparatus 900 that may implement elements of the system and processes described herein. Input devices 904 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 904 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 904 are provided via various machine signal conductors (e.g., busses or network interfaces) and circuits to memory 906.

The memory 906 is typically what is known as a first or second level memory device, providing for storage (via configuration of matter or states of matter) of signals received from the input devices 904, instructions and information for controlling operation of the CPU 902, and signals from storage devices 910.

Information stored in the memory 906 is typically directly accessible to the CPU 902 of the device. Signals input to the device cause the reconfiguration of the internal material/energy state of the memory 906, creating in essence a new machine configuration, influencing the behavior of the digital apparatus 900 by affecting the behavior of the CPU 902 with control signals (instructions) and data provided in conjunction with the control signals.

Second or third level storage devices 910 may provide a slower but higher capacity machine memory capability. Examples of storage devices 910 are hard disks, optical disks, large capacity flash memories or other non-volatile memory technologies, and magnetic memories.

The CPU 902 may cause the configuration of the memory 906 to be altered by signals in storage devices 910. In other words, the CPU 902 may cause data and instructions to be read from storage devices 910 in the memory 906 from which may then influence the operations of CPU 902 as instructions and data signals, and from which it may also be provided to the output devices 908. The CPU 902 may alter the content of the memory 906 by signaling to a machine interface of memory 906 to alter the internal configuration, and then converted signals to the storage devices 910 to alter its material internal configuration. In other words, data and instructions may be backed up from memory 906, which is often volatile, to storage devices 910, which are often non-volatile.

Output devices 908 are transducers which convert signals received from the memory 906 into physical phenomenon such as vibrations in the air, or patterns of light on a machine display, or vibrations (i.e., haptic devices) or patterns of ink or other materials (i.e., printers and 3-D printers).

The network interface 912 receives signals from the memory 906 and converts them into electrical, optical, or wireless signals to other machines, typically via a machine network. The network interface 912 also receives signals from the machine network and converts them into electrical, optical, or wireless signals to the memory 906.

Figure 10:
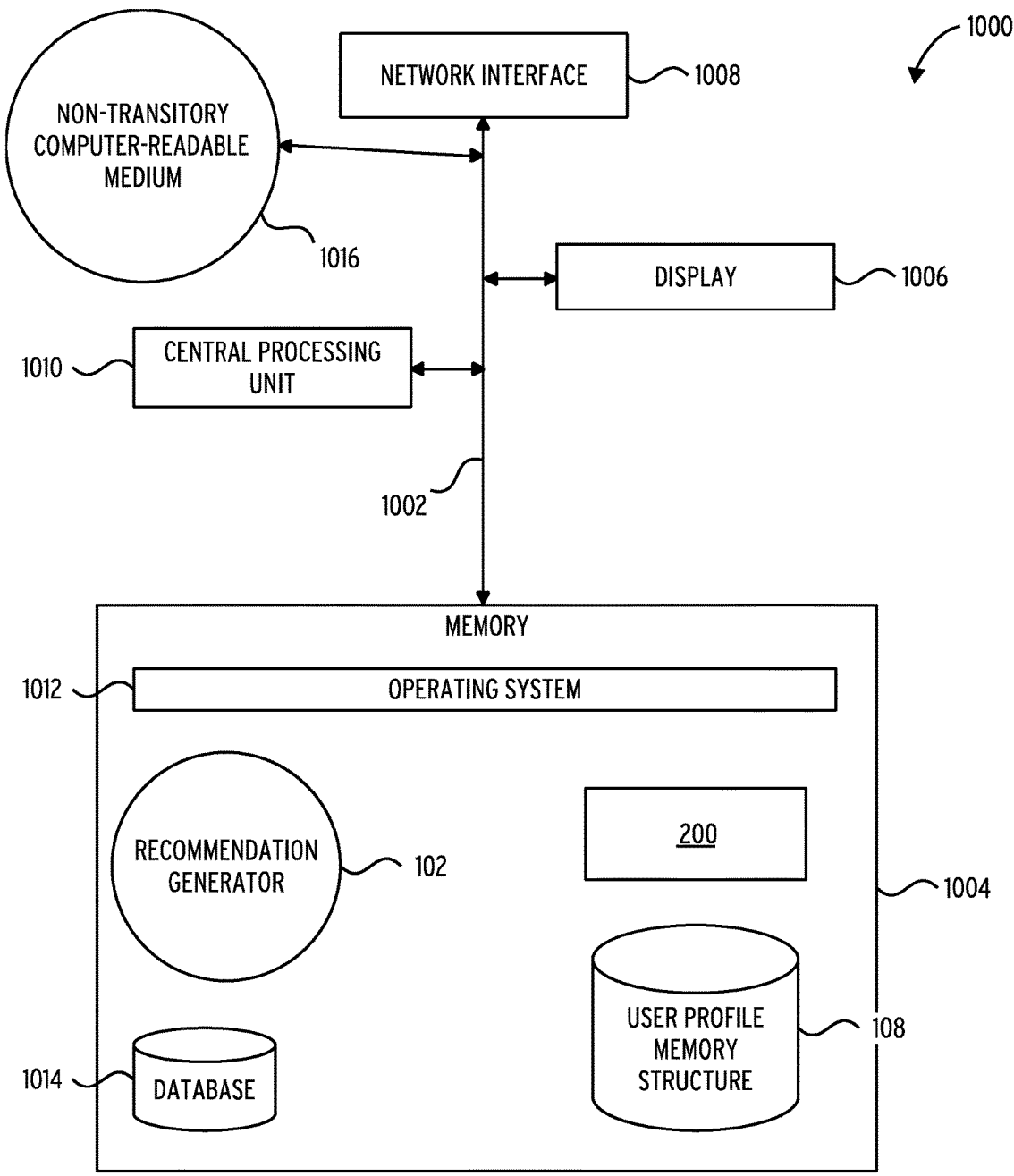
FIG. 10 illustrates a server 800 in accordance with one embodiment.

FIG. 10 illustrates several components of an exemplary server 1000 in accordance with one embodiment. In various embodiments, server 1000 may include a desktop PC, server, workstation, mobile phone, laptop, tablet, set-top box, appliance, or other computing device that is capable of performing operations such as those described herein. In some embodiments, server 1000 may include many more components than those shown in FIG. 10. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, server 1000 may comprise one or more physical and/or logical devices that collectively provide the functionalities described herein. In some embodiments, server 1000 may comprise one or more replicated and/or distributed physical or logical devices.

In some embodiments, server 1000 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Server 1000 includes a bus 1002 interconnecting several components including a network interface 1008, a display 1006, a central processing unit 1010, and a memory 1004.

Memory 1004 generally comprises a random access memory ("RAM") and permanent non-transitory mass storage device, such as a hard disk drive or solid-state drive. Memory 1004 stores an operating system 1012.

These and other software components may be loaded into memory 1004 of server 1000 using a drive mechanism (not shown) associated with a non-transitory computer-readable medium 1016, such as a floppy disc, tape, DVD/CD-ROM drive, memory card, or the like.

Memory 1004 also includes database 1014. In some embodiments, server 1000 may communicate with database 1014 via network interface 1008, a storage area network ("SAN"), a high-speed serial bus, and/or via the other suitable communication technology.

In some embodiments, database 1014 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method of generating recommendations comprising:
    displaying, on a computing device having a display screen, a user interface;
    displaying one or more recommended purchase options for a user profile in the user interface, wherein the one or more recommended purchase options are a weighted set, in response to:
        receiving from a rating system, a review stream comprising verified user reviews;
        parsing from the verified user reviews: user profile identifiers, recommendation scores and purchase options;
        operating a processor to:
            generate purchase option aggregate data, in response to aggregating the purchase options and analyzing the purchase options;
            generate an aggregate recommendation score from the recommendation scores through operation of an aggregator;
            select a plurality of reviewer profiles from a user profile memory structure through operation a profile selector configured with the user profile identifiers;
            parse the user profile and reviewer profiles into a set of comparison points, through operation of a profile parser;
            calculate a user relevance factor for each of the reviewer profiles, through operation of a comparator, in response to receiving the set of comparison points;
            create a modulated review stream by modulating review weights of the verified user reviews within the review stream through operation of a rating modulation filter configured with the aggregate recommendation score, the user relevance factor and the purchase option aggregate data;
            operate a signal amplifier to attenuate recommendations from the modulated review stream through operation a recommendation generator configured with the modulated review stream, and to amplify user reviews based on a GPS signal; and
            control the release of the purchase options as the recommended purchase options from the review stream to a user interface assembler through operation of a purchase option gateway configured with the recommendations.

2. The method of claim 1 wherein calculating the user relevance factor may include comparison of demographic data, verified purchase data, social media network, purchase type, geolocation and travel history.

3. The method of claim 1 wherein constructing the user profile further comprises: combining the verified user reviews, demographic and direct answer data into the user profile.

4. The method of claim 1, wherein the profile constructor constructing the user profile further comprises collecting purchase information, the verified user reviews, verified purchase data and personal data, and updating information in the user profile.

5. The method of claim 1 wherein the rating modulation filter modulating the review stream amplifies the review weight of the verified user reviews based on the value of the user relevance factor.

6. The method of claim 1, wherein the purchase option aggregate data further comprises data based on a meta analysis of the verified user reviews for the purchase options.

7. The method of claim 1, wherein the user profile further comprises verified purchase data, the verified user reviews, demographic information, travel habits, and direct answer data.

8. The method of claim 1, wherein the modulated review stream further comprises a plurality of weighted aggregate recommendation scores.

9. The method of claim 1, wherein the recommendation score further comprises a numerical score denoting whether the verified user review is positive or negative.

10. A non-transitory computer-readable storage medium, the computer-readable storage medium including instructions that when executed by a computer, cause the computer to:
    display, on a computing device having a display screen, a user interface;
    display one or more recommended purchase options for a user profile in the user interface, wherein the one or more recommended purchase option options are a weighted set, in response to:
        receiving from a rating system, a review stream comprising verified user reviews;
        parsing from the verified user reviews: user profile identifiers, recommendation scores and purchase options;
        operating a processor of the computer system to:
            generate purchase option aggregate data, in response to aggregating the purchase options and analyzing the purchase options;
            generate an aggregate recommendation score from the recommendation scores through operation of an aggregator;
            select a plurality of reviewer profiles from a user profile memory structure through operation a profile selector configured with the user profile identifiers;
            parse the user profile and reviewer profiles into a set of comparison points, through operation of a profile parser;
            calculate a user relevance factor for each of the reviewer profiles, through operation of a comparator, in response to receiving the set of comparison points;
            create a modulated review stream by modulating review weights of the verified user reviews within the review stream through operation of a rating modulation filter configured with the aggregate recommendation score, the user relevance factor and the purchase option aggregate data;
        operate a signal amplifier to attenuate recommendations from the modulated review stream through operation a recommendation generator configured with the modulated review stream, and to amplify user reviews based on a GPS signal; and
        control the release of the purchase options as the recommended purchase options from the review stream to a user interface assembler through operation of a purchase option gateway configured with the recommendations.

11. The computer-readable storage medium of claim 10 wherein calculating the user relevance factor may include comparison of demographic data, verified purchase data, social media network, purchase type, geolocation and travel history.

12. The computer-readable storage medium of claim 10 wherein constructing the user profile further comprises: combine the verified user reviews, demographic and direct answer data into the user profile.

13. The computer-readable storage medium of claim 10, wherein the profile constructor constructing the user profile further comprises collect purchase information, the verified user reviews, verified purchase data and personal data, and updating information in the user profile.

14. The computer-readable storage medium of claim 10 wherein the rating modulation filter modulating the review stream amplifies the review weight of the verified user reviews based on the value of the user relevance factor.

15. The computer-readable storage medium of claim 10, wherein the purchase option aggregate data further comprises data based on a meta analysis of the verified user reviews for the purchase options.

16. The computer-readable storage medium of claim 10, wherein the user profile further comprises verified purchase data, the verified user reviews, demographic information, travel habits, and direct answer data.

17. The computer-readable storage medium of claim 10, wherein the modulated review stream further comprises a weighted aggregate recommendation score.

18. The computer-readable storage medium of claim 10, wherein the recommendation score further comprises a numerical score denote whether the verified user review is positive or negative.

* * * * *